March 27, 1951 — R. E. SHERWOOD — 2,546,907
EARTH-MOVING MACHINE
Filed Aug. 25, 1947 — 4 Sheets-Sheet 1
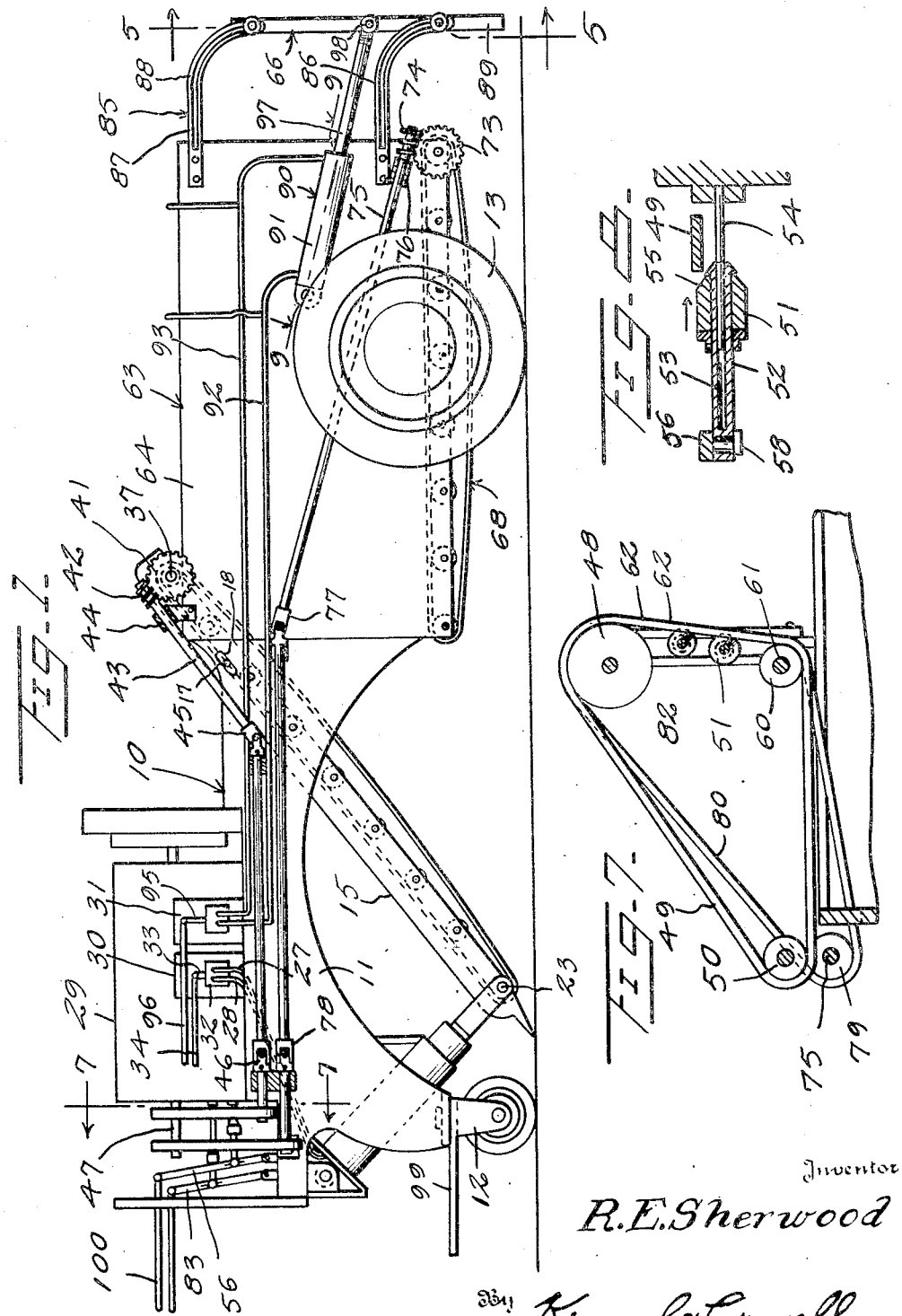
Inventor
R. E. Sherwood
Kimmel & Crowell
Attorneys

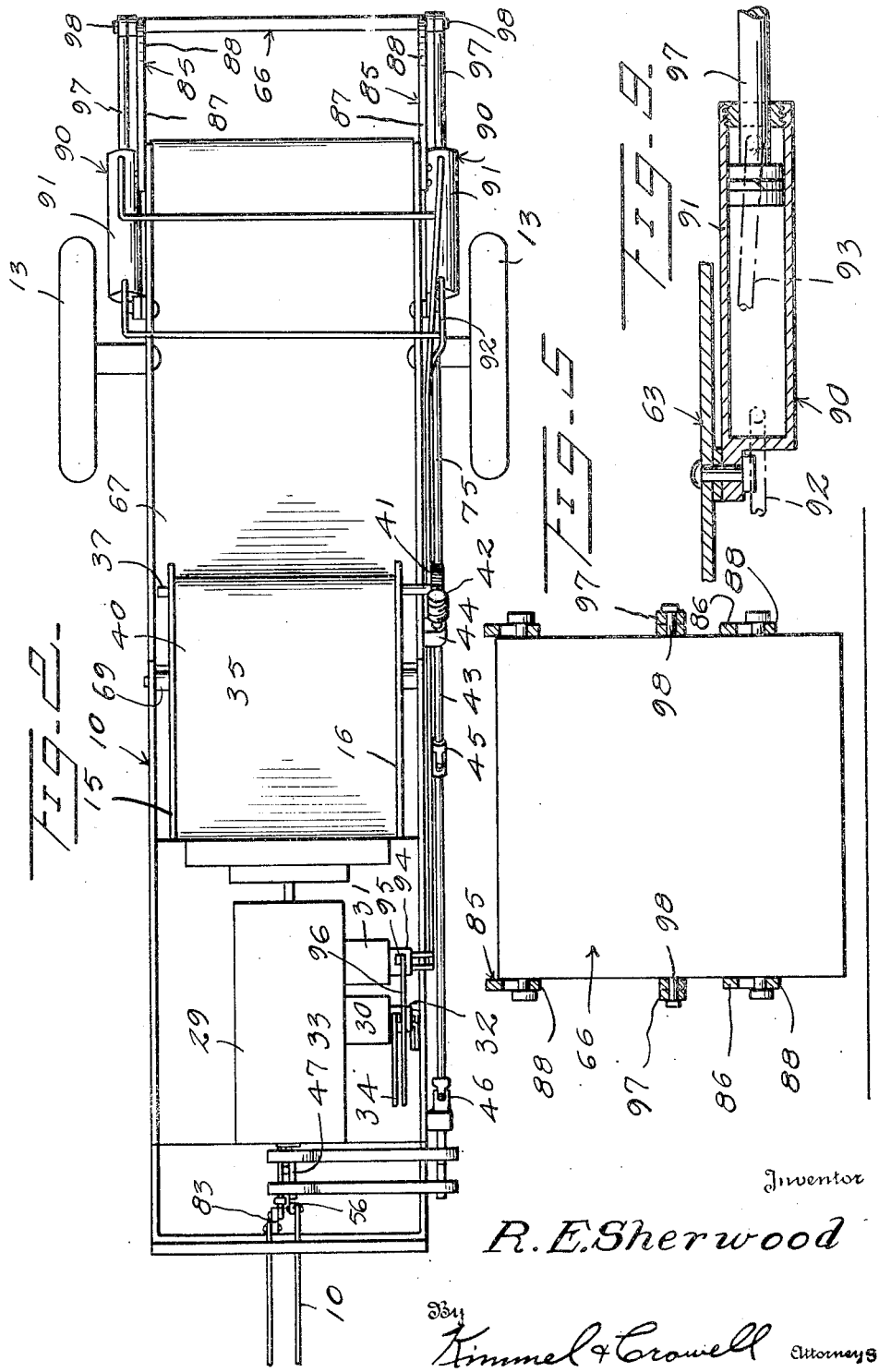

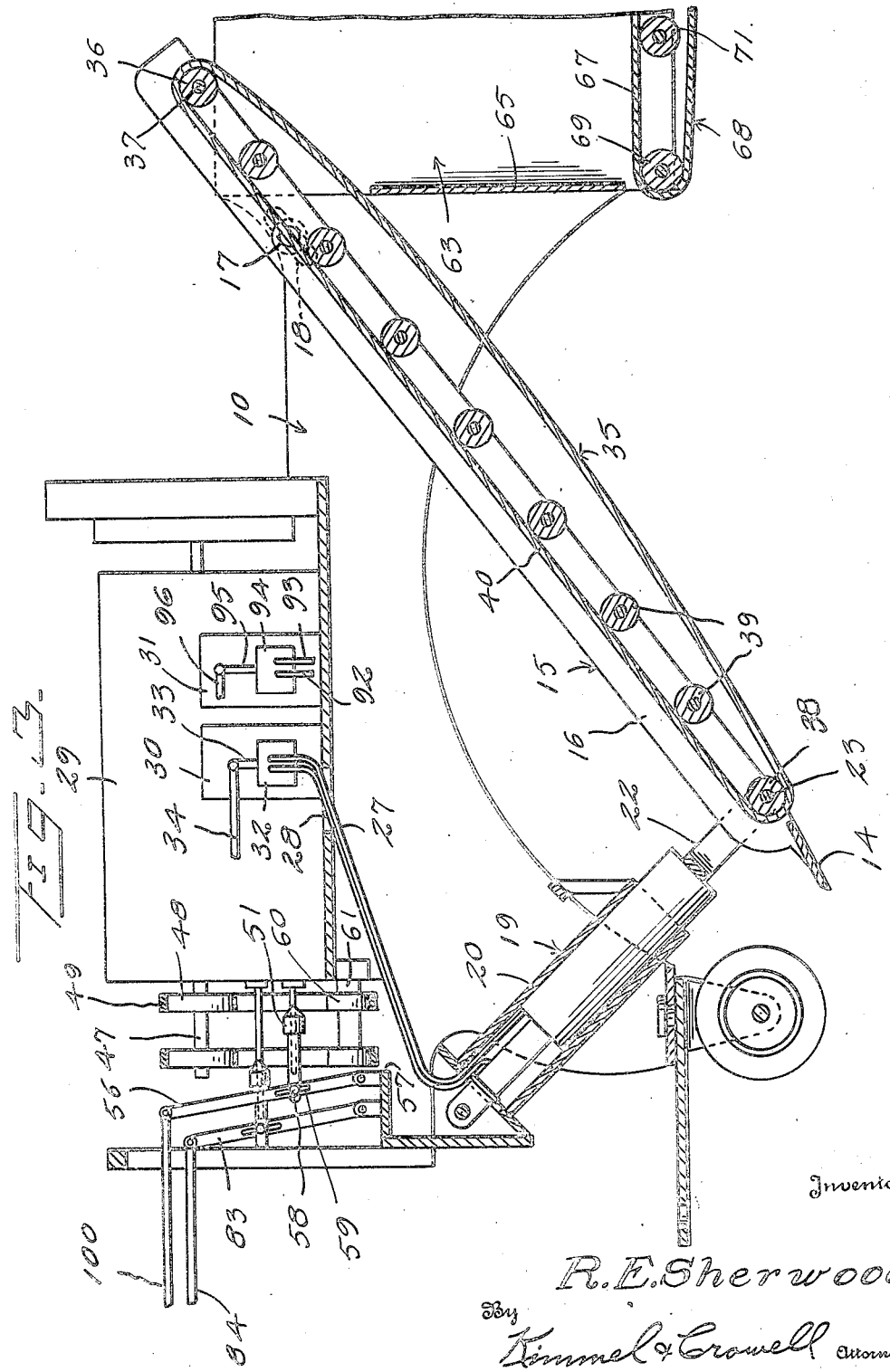

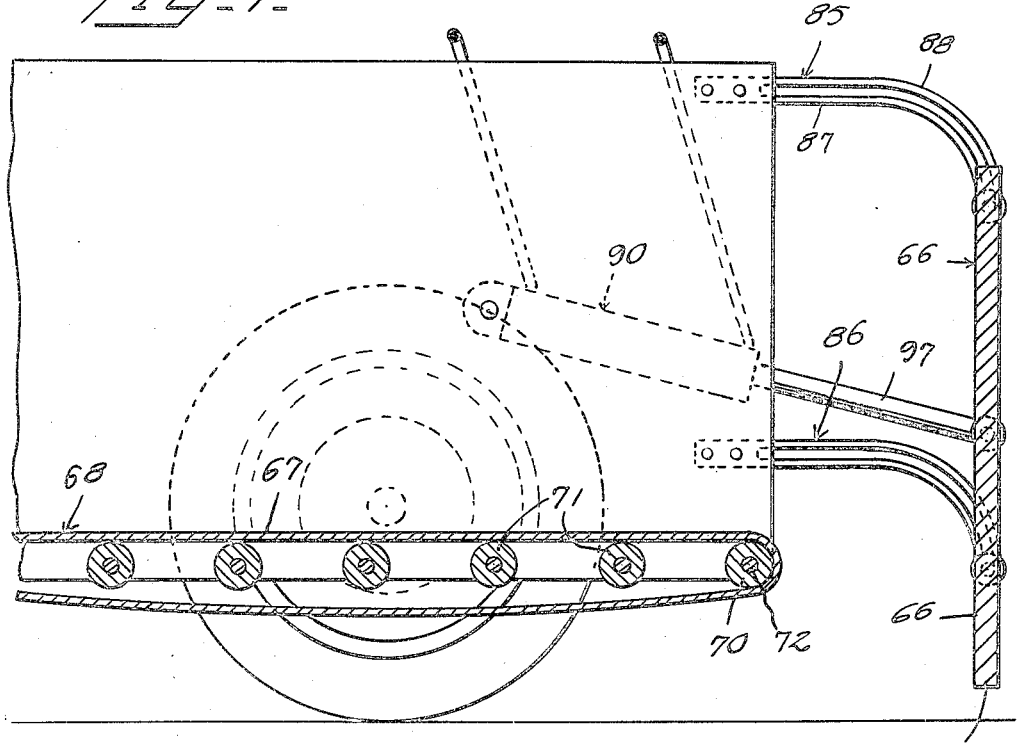
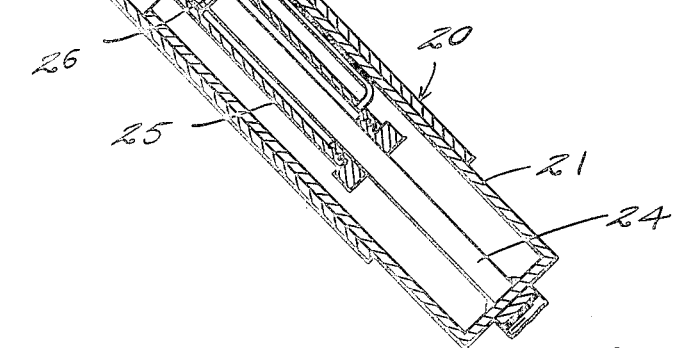

Patented Mar. 27, 1951

2,546,907

UNITED STATES PATENT OFFICE 2,546,907

EARTH-MOVING MACHINE

Raymond E. Sherwood, Twin Falls, Idaho

Application August 25, 1947, Serial No. 770,523

1 Claim. (Cl. 37—8)

This invention relates to earth working machines.

An object of this invention is to provide a machine which includes a digging blade with an elevator extending rearwardly and upwardly from the blade and adapted to discharge the material into a receiver formed with movable bottom and an adjustable remotely controlled rear gate so that the receiver or hopper may be filled and then discharged at a remote point.

Another object of this invention is to provide a machine of this kind which can be used for levelling uneven ground for irrigation purposes, or discharging the removed soil in a pile at any selected location.

A further object of this invention is to provide a machine of this kind which is of simple construction and can be drawn by a small tractor, the machine having an independent power source so that the power unit for the machine may be more or less than the power of the tractor, and the size of this machine is not dependent upon the size of the tractor.

A further object of this invention is to provide a machine wherein the hopper or receiver includes a conveyor in the bottom thereof, and also includes a rear gate which can be moved by hydraulic operators from a closed position to a selected open position and in the open position of the gate it may be used as a levelling or spreading blade supported rearwardly from the hopper at a selected height from the ground so that the dirt discharged onto the ground by the conveyor may be levelled off at any selected height.

With the above and other objects in view, my invention consists in the arrangement, combination and details of construction disclosed in the drawings and specifications, and then more particularly pointed out in the appended claim.

In the drawings,

Figure 1 is a detail side elevation of an earth moving machine constructed according to an embodiment of this invention, Figure 2 is a plan view of the device, Figure 3 is a fragmentary vertical section through the forward portion of the device, Figure 4 is a fragmentary vertical section of the rear portion of the device, Figure 5 is a fragmentary sectional view taken on the line 5—5 of Figure 1, Figure 6 is a sectional view taken longitudinally through the digger adjuster, Figure 7 is a fragmentary sectional view taken on the line 7—7 of Figure 1, Figure 8 is a fragmentary sectional view showing one of the idler pulleys; and Figure 9 is a fragmentary sectional view taken on the line 9—9 of Figure 1.

Referring to the drawings, the numeral 10 designates generally a frame structure which at the forward end 11 thereof has mounted thereon one or more caster wheels 12. The frame 10 also has mounted adjacent the rear end thereof a pair of supporting wheels 13.

A digging blade 14 is carried by the lower forward end of a digging frame 15 which is composed of opposite side members 16 which are pivotally mounted on a pivot 17 carried by the frame 10. The side members 16, as shown in Figure 3, are formed with elongated slots 18 to compensate for adjustment of the frame 15, from an inoperative position to an operative position.

The digger frame 15 is supported and adjusted at its lower forward end by means of a hydraulic member generally designated as 19. The hydraulic member 19 includes a cylinder 20 which is fixed to the frame 10 at the forward end thereof, and the cylinder 20 has slidable therein a cylinder 21 which is connected to the lower forward end of the digger frame 15 by means of a yoke 22 pivotally secured, as at 23, to the digger frame 15.

The cylinder 21 forms a sealing means for sealing a piston rod 24 which is slidable in the pressure cylinder 25. A piston 26 is secured to the inner end of the piston rod 25 and a pair of fluid pipes 27 and 28 are connected to the pressure cylinder 25 adjacent the opposite ends thereof for effecting adjustable movement of the piston 26.

A power unit 29 is mounted on the frame 10 and has operatively connected therewith a pair of fluid pumps 30 and 31. The pump 30 is the digger operating pump and a valve 32 is connected with the pump 30 and includes a valve lever 33 with which an adjusting rod 34 is connected and extended to the tractor with which the device herein described is adapted to be connected. The pipe 27 is connected to one side of the valve 32, and the pipe 28 is connected to the opposite side of this valve so that the desired fluid pressure may be communicated with the pressure cylinder 25.

The digger frame 15 also includes an endless conveyor 35 disposed between the side members 16. The conveyor 35 is drawn over an upper driving roller 36 mounted on a shaft 37, and the lower forward end of the conveyor 35 is drawn over a lower idler roller 38. A plurality of intermediate idler rollers 39 are disposed between the rollers 36 and 38 for holding the upper run 40 of the conveyor 35 in a substantially straight line.

The driving shaft 37 has fixed thereto a worm gear 41 with which a worm 42 carried by a shaft 43 meshes. The shaft 43 is journalled in one or more bearings 44 carried by the frame 10, and the shaft 43 has interposed therein a pair of universal joints 45 and 46. The power unit 29 includes a driving shaft 47 having mounted thereon a driving pulley 48 about which an endless belt 49 engages. The forward end of the shaft 43 has mounted thereon a pulley 50 about which the belt 49 engages, and preferably the belt 49 is normally loose so that in its normal position the belt 49 will not rotate pulley 50.

In order to effect operation of the pulley 50 with the pulley 48, I have provided an idler belt tightening pulley 51 which is rotatably carried by a rod 52 formed with a bore 53 which slidably engages about a guide and supporting rod 54 fixed to and extending forwardly from the power member 29. The rear end of the pulley 51 is tapered as indicated at 55 so that this pulley can readily ride under the belt 49 as it is moved to operative position.

A pulley adjusting lever 56 is rockably carried by a support 57 which is carried by the frame 10, and the lever 56 is connected by means of a pivot 58 which extends through an elongated slot 59 to the rod 52. An intermediate idler pulley 60 is mounted on a shaft 61 disposed below the shaft 47 and engages the belt 49 so as to form a substantially triangular arrangement of the belt 49 with the clutching pulley 51 engaging the substantially vertical run 62 of the belt 49 between the idler 60 and the driving pulley 48.

The frame 10 also includes a hopper or receiver 63 which extends rearwardly from the digger frame 15, and is adapted to receive the material elevated by the conveyor 35. The hopper or receiver 63 includes opposite side walls 64, a forward wall 65, and a gate or rear wall 66. The bottom of the receiver or hopper 63 is formed by means of the upper run 67 of an endless conveyor 68. The endless conveyor 68 engages at its forward end about an idler roller 69 and at its rear end about a driving roller 70.

A plurality of intermediate idler rollers 71 engage beneath the upper run of the conveyor and hold the upper run of the conveyor in substantially horizontal or flat position. The conveyor 68 is adapted at its upper run to move rearwardly for discharging the material from the hopper or receiver 63 rearwardly of the machine.

The driving roller 70 is mounted on a driving shaft 72 which has a worm gear 73 fixed thereon and with which a worm 74 meshes. The worm 74 is secured to a shaft 75 journalled in bearings 76, and the shaft 75 extends upwardly and forwardly and has interposed therein a pair of universal joints 77 and 78. The shaft 75 at its forward end has fixed thereto a pulley 79 about which a driving belt 80 engages. The belt 80 also engages about a driving pulley 81 which is fixed to the shaft 47 and a clutching pulley 82 engages the belt 80 in the same manner as the clutching pulley 51 engages the belt 49 so as to effect operation of the shaft 75 and the conveyor 68.

The details of construction and operation of the clutching pulley 51, shown in Figure 8, are the same with respect to the pulley 82. The pulley 82 has connected thereto an adjusting lever 83 with which an operating rod 84 is connected. In order to provide for adjustment of the gate or rear wall 66 of the receiver or hopper 63, the gate 66 is slidably mounted on upper and lower pairs of guide or bracket arms 85 and 86 respectively which are fixed to and extend rearwardly from the hopper or receiver 63. The guide members 85 and 86, as shown more clearly in Figure 1, include horizontal rearwardly extending portions 87 which, at their rear ends, merge in downwardly curved portions 88. In this manner the gate 66 may be initially adjusted on the horizontal portions 87 at which time the lower edge 89 of the gate will remain in its normal elevation which it assumes when in closed position.

The downwardly curved rear portions 88 are provided so that the lower edge 89 of the gate may be lowered to the desired degree and at this time the gate 66 may constitute a levelling blade for levelling any dirt or material which may be discharged onto the ground by the conveyor 68 between the rear end of the receiver or hopper 63 and the rearwardly extended or adjusted gate 66.

The gate 66 is adapted to be adjusted to either open or closed position by means of hydraulic operators 90 secured one to each side of the receiver or hopper 63. The hydraulic operators 90 include a cylinder 91 which is connected by means of a pair of pipes 92 and 93 to the pump 31. The pump 31 has connected thereto a valve 94 having a valve adjusting lever 95 with which a valve adjusting rod 96 is connected. The hydraulic gate adjuster or operator 90 also includes a plunger 97 which is pivotally connected as at 98 to the gate 66.

In the use and operation of this device, the frame 10 is adapted to be connected to a tractor by means of a drawbar 99 so that the device may be pulled over the surface of the ground. In inoperative position the digging blade 14 will be disposed above the surface of the ground, but when the ground is to be engaged the blade 14 is lowered by the hydraulic member 19 which swings the digger frame 15 downwardly and rearwardly.

The conveyor 35 is operated by the power unit 29, being clutched thereto by means of the clutching pulley 51 which may be adjusted to clutching position by an adjusting rod 100 which is connected to the pulley adjusting lever 56. In the event it is desired to move the quantity of dirt, the gate 66 may be adjusted to its closed position and the discharge conveyor 69 may be maintained inoperative until the receiver or hopper 63 has been substantially filled. The device may then be moved to the desired location, whereupon the gate 66 may be moved rearwardly to either discharge the dirt in a pile, whereupon the gate 66 will be moved to the rear portion of the horizontal portions 87 of the guides or brackets 85 or 86. If, during the discharge of the receiver 63, it is desired to level the discharged dirt to a predetermined height, the gate 66 is moved rearwardly an additional distance to engage in the downwardly curved track or supporting portions 88. The machine, during the levelling operation is moved forwardly at the desired speed at the same time the conveyor 68 discharges the dirt from the receiver.

With a device of this kind a relatively small powered tractor may be connected with the machine, the tractor being of only sufficient power to pull the machine during the digging operation, and when the receiver is filled. In this manner the machine herein disclosed may be of any desired size independent of the size of the tractor, inasmuch as any conventional tractor is usually provided with sufficient power to pull this machine during the digging, loading and transferring, together with the levelling operations.

I do not mean to confine myself to the exact details of construction herein disclosed, but claim all variations falling within the purview of the appended claim.

Having thus described my invention, what I claim is:

In an earth moving machine, a body, wheel means supporting said body, said body including spaced side walls and a front wall, a movable floor means for moving dirt placed in said body in a rearwardly direction, power means for operating said movable floor, a pair of fixed guide means having vertically spaced and horizontally disposed arms carried by each of said side walls, said arms having parallel portions extending rearwardly of said body including downwardly curved extended ends, a movable rear wall of said body disposed between said arms and slidably connected thereto having a lower edge movable below the plane of said floor, a hydraulic power means interconnecting said rear wall and said body and operative to move the rear wall in a vertical position rearwardly and downwardly along said arms whereby an opening is effected rearwardly of said body with said rear wall acting as a vertically disposed adjustable spreader for dirt moved rearwardly by said floor.

RAYMOND E. SHERWOOD.

REFERENCES CITED

The following references are of record in the file of this patent:

UNITED STATES PATENTS

| Number | Name | Date |
|---|---|---|
| 827,457 | Martin | July 31, 1906 |
| 1,459,385 | Wills | June 19, 1923 |
| 1,494,458 | Campbell | May 20, 1924 |
| 1,785,106 | Adams | Dec. 16, 1930 |
| 1,870,673 | Detrick | Aug. 9, 1932 |
| 2,239,029 | Barrett | Apr. 22, 1941 |
| 2,396,287 | Robb | Mar. 12, 1946 |